US008126973B2

(12) United States Patent
Bryant et al.

(10) Patent No.: US 8,126,973 B2
(45) Date of Patent: Feb. 28, 2012

(54) SYSTEM AND METHOD FOR INCORPORATING SOCIAL NETWORKING MAPS IN COLLABORATION TOOLING AND DEVICES

(75) Inventors: Raquel Benita Bryant, Raleigh, NC (US); Veronique Le Shan Tice Moses, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 11/966,939

(22) Filed: Dec. 28, 2007

(65) Prior Publication Data

US 2009/0172081 A1 Jul. 2, 2009

(51) Int. Cl.
G06F 15/16 (2006.01)
(52) U.S. Cl. ........................................ 709/206
(58) Field of Classification Search ........... 709/204–206
See application file for complete search history.

(56) References Cited

U.S. PATENT DOCUMENTS

| | | | | |
|---|---|---|---|---|
| 7,849,103 | B2 * | 12/2010 | Hyatt et al. | 707/792 |
| 2005/0171799 | A1 * | 8/2005 | Hull et al. | 705/1 |
| 2005/0171832 | A1 * | 8/2005 | Hull et al. | 705/10 |
| 2005/0177385 | A1 * | 8/2005 | Hull et al. | 705/1 |
| 2005/0267940 | A1 * | 12/2005 | Galbreath et al. | 709/206 |
| 2007/0255807 | A1 * | 11/2007 | Hayashi et al. | 709/219 |
| 2008/0005073 | A1 * | 1/2008 | Meek et al. | 707/3 |
| 2009/0150346 | A1 * | 6/2009 | Soderstrom | 707/3 |

OTHER PUBLICATIONS

Erickson et al, "Socially Translucent Systems: Social Proxies, Persistent Conversation, and the Design of Babble", CHI '99 paper, 1999.
Olga Kharif, "Social Networking Goes Mobile," Business Week, May 31, 2006.
Millen et al., Mind Maps and Causal Models: Using Graphical Representations of Field Research Data, http://acm.org/sigchi/chi97/proceedings/, 1997.
Semantic Studios, "Social Network Analysis," http://semanticstudios.com/publications/semantics/000006.php, Feb. 21, 2002.
orgnet.com, "Social Network Analysis, A Brief Introduction," printed Jul. 17, 2007.

* cited by examiner

*Primary Examiner* — Yemane Mesfin
(74) *Attorney, Agent, or Firm* — Van Leeuwen & Van Leeuwen

(57) ABSTRACT

A system and method for incorporating social networking maps in collaboration tools is presented. A user creates rules that are based upon the user's relationship with other users and provides the rules to a network server. The network server uses these rules when the network server receives a relational request from the collaboration tool in order to filter a hierarchal social networking map. The hierarchal social networking map is centrally located such that different collaboration types may utilize the hierarchal social networking map. After filtering the hierarchal social networking map, the network server sends a list of user identifiers to the collaboration tool, which allows the user to collaborate with recipient users corresponding to the list of user identifiers, which are users that share a particular relationship with the user.

14 Claims, 7 Drawing Sheets

SYSTEM AND METHOD FOR INCORPORATING SOCIAL NETWORKING MAPS IN COLLABORATION TOOLING AND DEVICES

BACKGROUND OF THE INVENTION

1. Technical Field

The present invention relates to a system and method for incorporating social networking maps in collaboration tooling and devices. More particularly, the present invention relates to a system and method for enabling a user of a collaboration tool the ability to communicate via actions and/or events with other users based upon real-time hierarchical social network relationship mapping.

2. Description of the Related Art

Social Networking Analysis (or SNA) is defined as the mapping and measuring of relationships and flows between people, groups, organizations, animals, computers or other information/knowledge processing entities. Nodes in the network may represent people and groups, while links show relationships or flows between the nodes. As such, SNA provides both a visual and a mathematical analysis of human relationship.

A challenge found is that existing art does not allow collaboration tools the ability to perform more advanced relationship-based actions based on dynamic real-time social networks. For example, a collaboration tool may be a cellphone, an email application, or an instant messaging application. In addition, social networks are typically not utilized across different collaboration tool types, thus increasing a user's burden to maintain multiple social networking maps.

What is needed, therefore, is a system and method for utilizing different types of collaboration tools in order to perform rule-based actions that allows a user to communicate with recipient users based upon relationships.

SUMMARY

It has been discovered that the aforementioned challenges are resolved using a system and method for coupling a hierarchal social network to multiple collaboration tool types in order to enable the collaboration tools the ability to perform actions based on real-time hierarchical social network relationship mapping. A user creates rules that are based upon the user's relationship with other users. A network server uses these rules when it receives a relational request from the collaboration tool in order to filter a hierarchal social networking map. After filtering, the network server sends a list of user identifiers to the collaboration tool, which allows the user to collaborate with recipient users corresponding to the list of user identifiers, which are users that share a particular relationship with the user.

A user instructs a collaboration tool to send a relational request to a network server. In turn, the network server retrieves a hierarchal social networking map and filters the hierarchal social networking map based upon one or more rules that correspond to the relational request. The network server then provides a list to the collaboration tool that includes user identifiers that meet the rules.

Next, the collaboration tool provides the user identifiers to the user, which allows the user the ability to collaborate with the users, such as sending a message to the users. In one embodiment, a user may define rules and execute more specific actions based upon more specific criteria, such as "send an instant message to all friends who know Jane and live in Miami." In this embodiment, the user may apply rules to create a rule in the "To" field when the rule is beyond a current name or group.

In another embodiment, the hierarchal social networking map is centralized, which allows different collaboration tool types the ability to communicate with other users using the same hierarchal social networking map.

In yet another embodiment, multiple social networking maps exist that are not centralized. In this embodiment, network maps may be synchronized given the correct authority to access each other through mapping technologies, thus sharing information across collaboration tools.

In yet another embodiment, a user may manually sync or replicate information amongst multiple interconnected social networking maps such that the user determines a time at which to have a collaboration tool reflect current networking information. In this embodiment, a user may be utilizing email in one tool and select the user's contact or address book. In doing so, a pop-up may appear such as "Your social network has been recently updated. Do you want to import those changes to your contact/profile list?" The message may be due to a different collaboration tool adding a new contact to its social network prior to the email.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
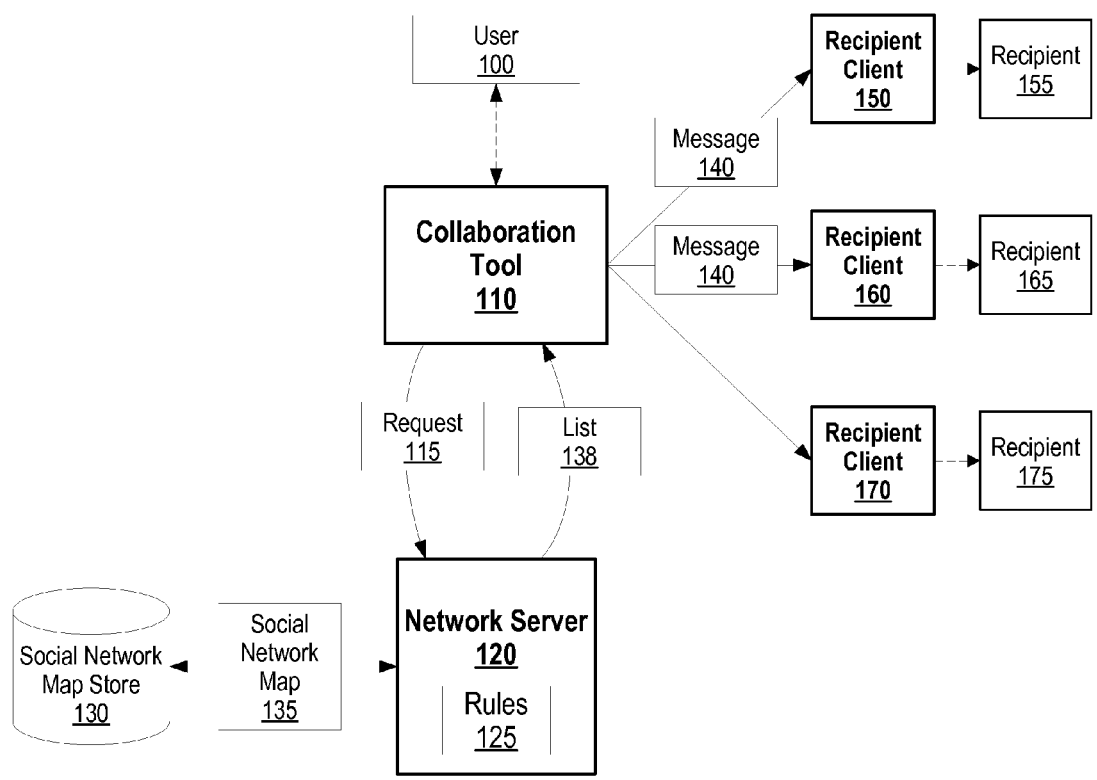
FIG. 1 is a diagram showing a collaboration tool sending messages to recipient users based upon their relationship with the collaboration tool's user.

FIG. 1 is a diagram showing a collaboration tool sending messages to recipient users based upon their relationship with the collaboration tool's user. User 100 creates rules 125 that are based upon user 100's relationships with other users (e.g., recipients 155-175). For example, user 100 may specify a rule "good friend" as users that user 100 met through direct contact instead of meeting through other friends. Network server 120 then receives relational request 115 from collaboration tools 110 and associates one of rules 125 to relational request 115. Next, network server 120 filters hierarchal social networking map 135 based upon the associated rule and provides filtered list 138 to collaboration tool 110. User 100 is then able to collaborate with users based upon the type of relationship they share with user 100.

User 100 invokes collaboration tool 110 to send relational request 115 to network server 120. In turn, network server 120 retrieves hierarchal social networking map 135 from social networking map store 130. Social networking map 135 may be stored on a nonvolatile storage area, such as a computer hard drive.

Network server 120 uses rules 125 to filter hierarchal social networking map 135. For example, request 115 may be a request to provide user identifiers for user 100's good friends. In this example, rules 125 may specify that good friends are those user identifiers within one path length from user 100 in hierarchal social networking map 135 (see FIG. 3 and corresponding text for further details).

Network server 120 filters social networking map 135 based upon the identified rule and provides list 138 to collaboration tool 110, which includes user identifiers that meet the identified rule. Collaboration tool 110 provides the user identifiers to user 100 and, in turn, user 100 composes a message and instructs collaboration tool 110 to send the message to the user identifiers included in list 138. The example in FIG. 1 shows that collaboration tool 110 sends message 140 to recipient clients 150 and 160, but does not send message 140 to recipient client 170. Using the example described above, recipient 155 and 165 may be good friends of user 100, whereas recipient 175 may be one of user 100's acquaintances.

In one embodiment, a user may execute actions such as sending an instant message, text message, email, etc., based upon more specific criteria such as "send an IM message to all friends or only friends who know Jane and live in Miami." In this embodiment, the user may apply rules to create a rule in the "To" field when the rule is beyond the current name or group. A similar address assistant may be provided that retrieves information from the social networking map store 130 and exposes available properties/meta-data for use by the user 100 in the social network.

Figure 2:
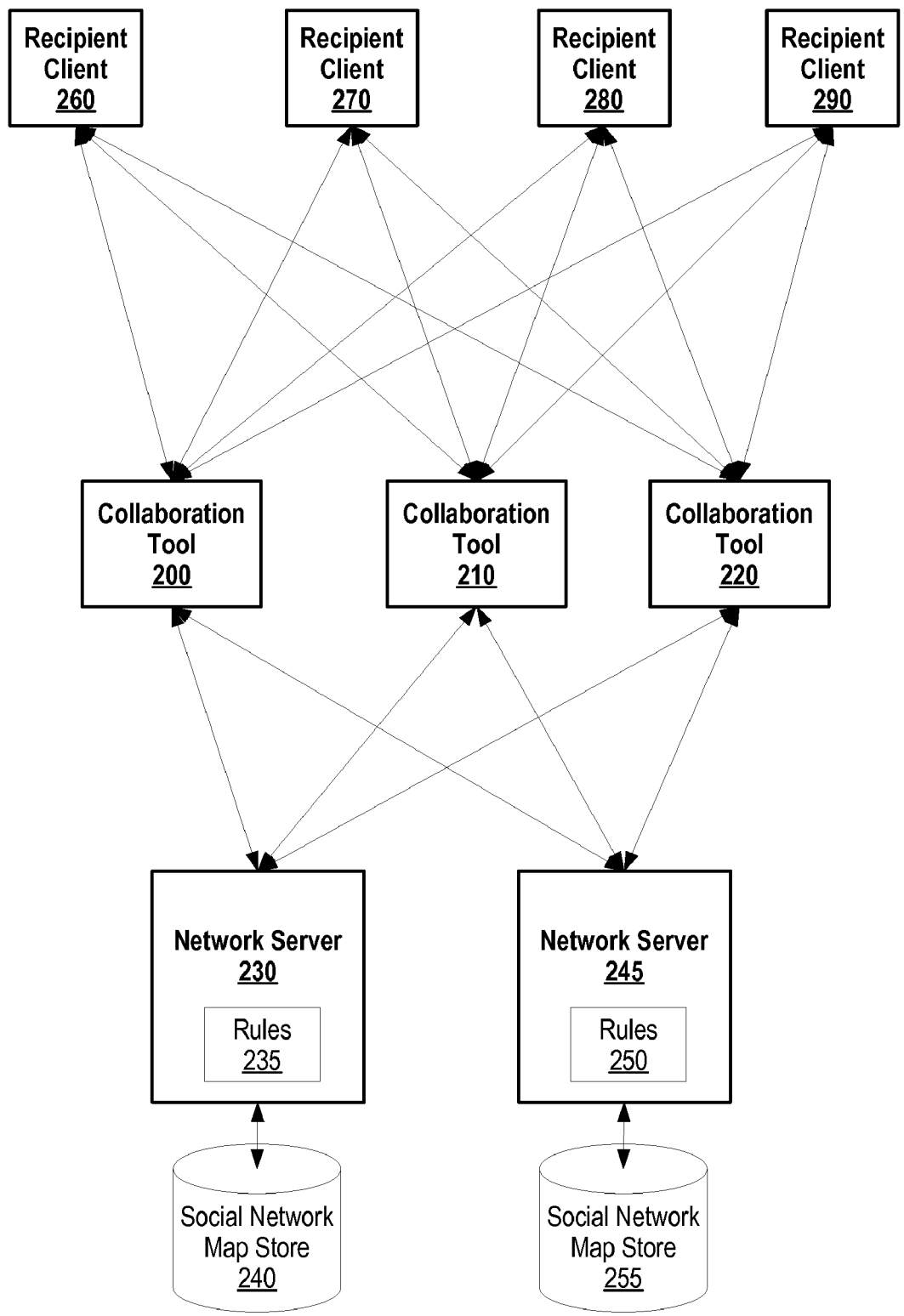
FIG. 2 is a diagram showing social networking maps centrally accessible to different types of collaboration tools, which provides users the ability to execute actions/events using the social networking map regardless of the type of collaboration tool.

In another embodiment, multiple collaboration tools may be pointing to the same server that stores social networking information (See FIG. 2 and corresponding text for further details). In this embodiment, as a user builds their social network independent of the collaboration tool, the information is seen in real-time across the other collaboration tools.

In yet another embodiment a user may manually sync or replicate information such that the user chooses when a current collaboration tool reflects the more recent social networking information. For example, a user may be utilizing email and selects the user's contact or address book. In this embodiment, a pop-up may appear such as "Your social network has been recently updated. Do you want to import those changes to your contact/profile list?"

FIG. 2 is a diagram showing social networking maps centrally accessible to different types of collaboration tools, which provides users the ability to execute actions/events using the social networking map regardless of the type of collaboration tool.

Collaboration tools 200-220 are different types, such as an email collaboration tool, an instant messaging collaboration tool, and a wireless phone collaboration tool. Since social networking maps store 240 and 255 are centralized using network servers 230 and 245, respectively, each of collaboration tools 200-220 may send relational user requests to network servers 230 and 245. In turn, network servers 230 and 245 filter a sending collaboration tool's social networking map based upon the sending collaboration tool's rules 240 and 250, respectively, and provide a list of user identifiers back to the sending collaboration tool. In turn, each of collaboration tools 200-220 interacts with recipient clients 260 through 290 based upon their users' relationships with other users.

Figure 3:
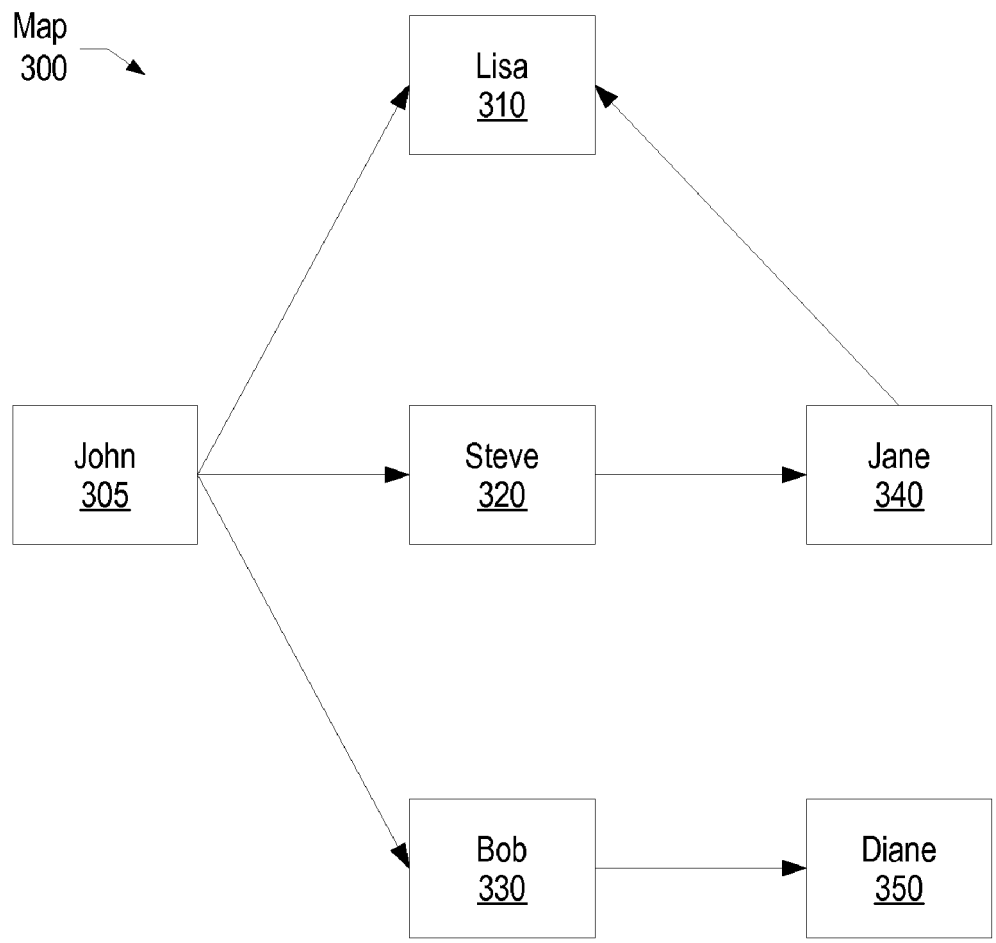
FIG. 3 is a diagram showing a hierarchical social networking map.

FIG. 3 is a diagram showing a hierarchical social networking map. Map 300 shows relationships between users, such as how they met each other. Map 300 shows that John 305 directly met Lisa 310, Steve 320, and Bob 330. John 305 met Jane 340 through Steve 320. Likewise, John 305 met Diane 350 through Bob 330. Map 300 also shows that Jane 340 directly met Lisa 310.

In one embodiment, the first entry into a social network map includes one pre-assumed relationship, which is the owner of the map. As the owner's system directory is built, the entries 1 to n−1 are available to attach to the current social network map. The invention described herein utilizes map 300 to enhance the usability of messaging and collaboration tools. For example, John could send an alert to "everyone who knows Jane" or "everyone who knows Jane and lives in Miami."

Figure 4:
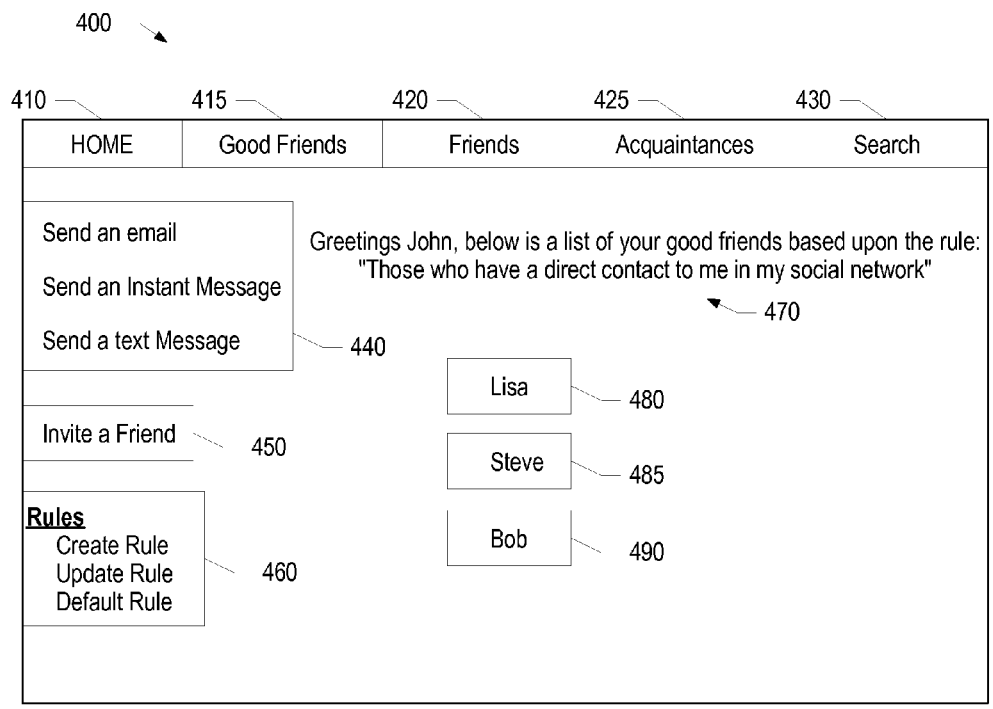
FIG. 4 is a diagram showing a user interface window that provides a user with the ability to communicate with other users based upon relationships.

FIG. 4 is a diagram showing a user interface window that provides a user with the ability to communicate with other users based upon relationships. Interface 400 is a result of a collaboration tool utilizing a hierarchical social networking map. Interface 400 allows a user to create and update rules using selections 460. The rules may be stored at the collaboration tool or at a centralized network server.

Once the user defines the rules, the user may select buttons 415 through 425, which generates a relational user request to retrieve user identifiers based upon the rules. The example in FIG. 4 shows that the user depressed button 415, which results in interface 400 displaying user identifiers 480 through 490 and displays message 470 to inform the user that user identifiers 480 through 490 are classified as "good friends."

The user may utilize selections 440 to collaborate with users corresponding to user identifiers 480 through 490. The user may also utilize selection 450 to add a user to the list of user identifiers in which to send a message. The user selects button 410 when the user wishes to return to interface 400's home page, and selects button 430 when the user wishes to perform a search, such as searching for a particular user identifier.

Figure 5:
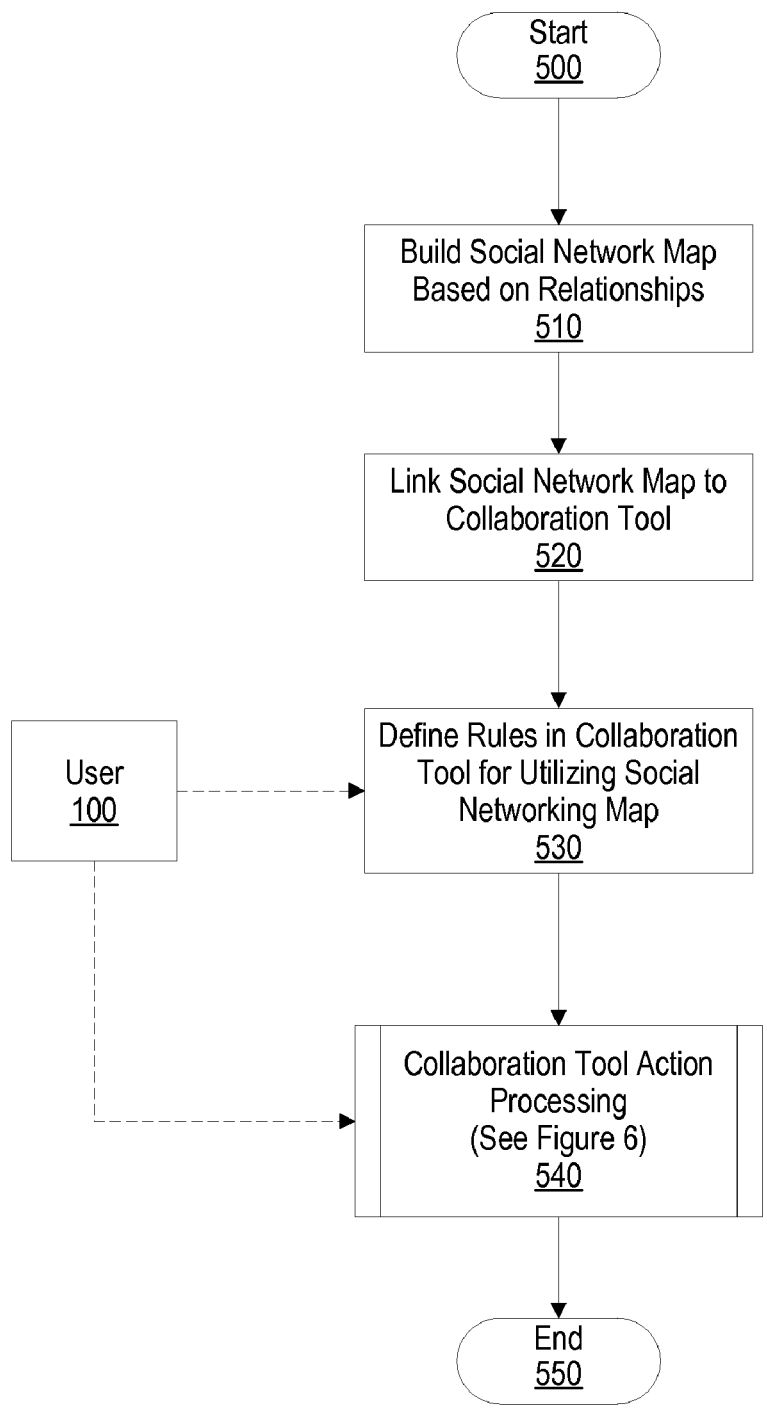
FIG. 5 is a high-level flowchart showing steps taken in using a social network map in conjunction with a collaboration tool to communicate with users based upon relationships.

FIG. 5 is a high-level flowchart showing steps taken in using a social network map in conjunction with a collaboration tool to communicate with users based upon relationships.

Processing commences at 500, whereupon processing builds a hierarchical social network map based upon relationships at step 510. The hierarchical social network may be based upon real life relationship development, such as meeting individuals indirectly through other contacts. For example, the relationship "John--->Steve--->Jane" describes that John knows Jane through Steve.

At step 520, processing links the social networking map to a collaboration tool and, at step 530, user 100 defines rules for utilizing the social network map. Using the example described above, everyone who is a direct contact to John may be categorized as "good friend", everyone with two pathlengths is "friend," and everyone with three or more pathlength is "acquaintance." In one embodiment, the rules may be stored on a social network map server that filters relational user requests and provides user identifiers to the collaboration server.

In another embodiment, user 100 may specify rules when user 100 is ready to execute an action. Since attributes or meta-data (e.g., gender, age, city, occupation) are mapped to each user in the relationship information, rules may be defined and dynamically associated with an action based on the metadata. For example, user 100 may be using email and, in the "To:" field, instead of including only allowable entries such as "names" and "groups," user 100 enters rules such as "location equals Miami" or "occupation equals engineer."

Figure 6:
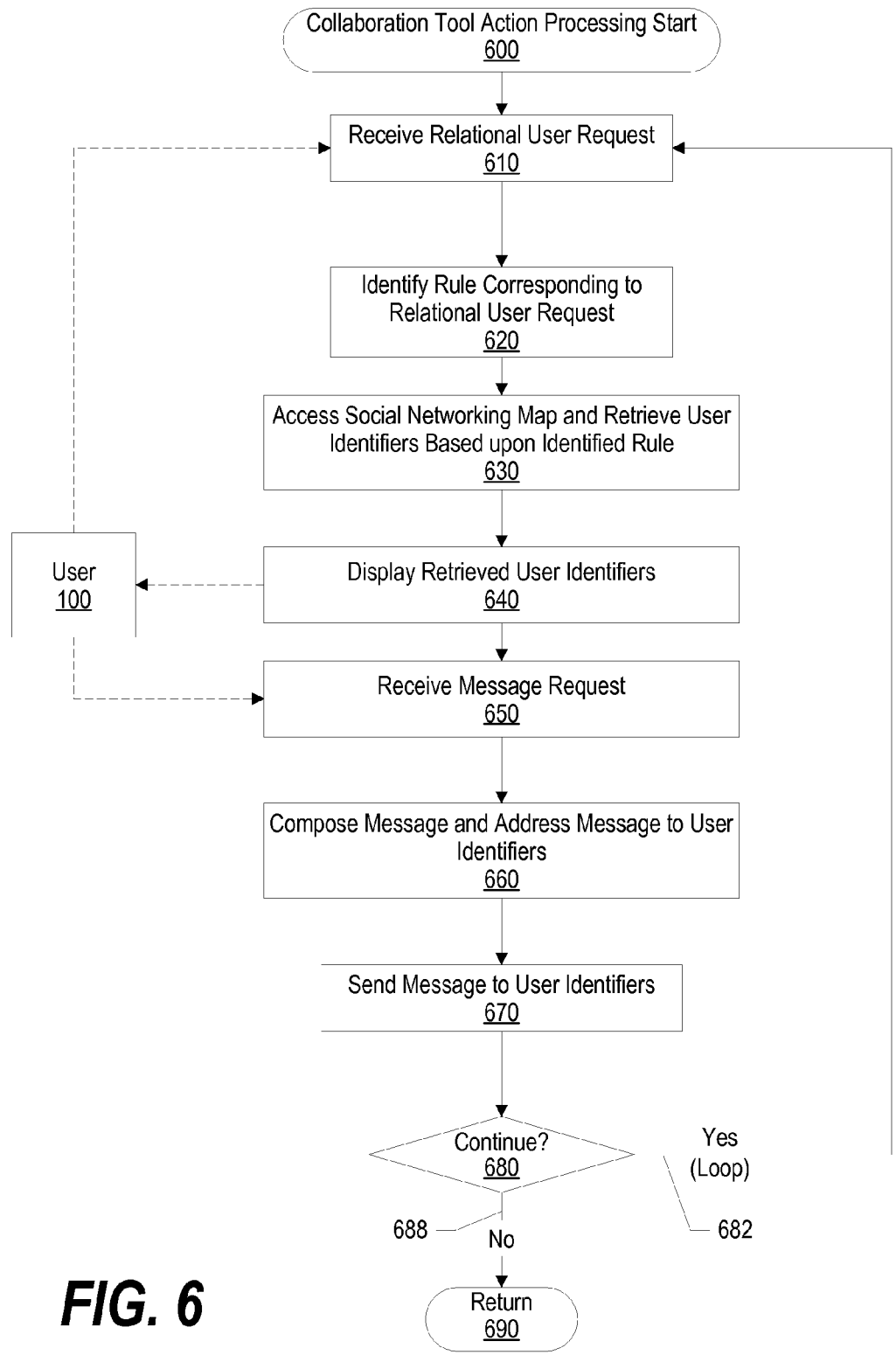
FIG. 6 is a flowchart showing steps taken in processing requests and utilizing a hierarchical social networking map to send messages to users based upon their relationship with a particular user.

The collaboration tool then receives requests and uses the hierarchical social networking map to send messages to users based upon their relationship with user 100 (pre-defined processing block 540, see FIG. 6 and corresponding text for further details). Processing ends at 550.

FIG. 6 is a flowchart showing steps taken in processing requests and utilizing a hierarchical social networking map to send messages to users based upon their relationship with a particular user.

Processing commences at 600, whereupon processing receives a relational user request from user 100 at step 610. The relational user request is a request from user 100 to provide user identifiers based upon user 100's relationships with other users. For example, user 100 may wish to review all users that are "good friends."

At step 620, processing identifies a rule corresponding to the relational user request. Using the example described above, the rule may specify that everyone within one path length from user 100 in a hierarchical social network is a good friend. This step may occur at the collaboration tool, or the collaboration tool may send a request to a network server in order for the network server to identify a corresponding rule.

Processing accesses the hierarchical social networking map at step 630 and retrieves user identifiers that corresponds to the identified rule (e.g., all users within one path length of user 100). At step 640, processing provides the retrieved user identifiers to user 100 utilizing a user interface, such as interface 400 shown in FIG. 4.

User 100 reviews the user identifiers and provides a message request to the collaboration tool at step 650. At step 660, processing composes a message to the user identifiers based upon input from user 100 and, at step 670, processing sends the message to the user identifiers.

A determination is made as to whether processing should continue to receive requests from user 100 (decision 680). If processing should continue, decision 680, branches to "Yes" branch 682 whereupon processing loops back to receive and process more user requests. This looping continues until processing should terminate, at which point decision 680 branches to "No" branch 688 whereupon processing returns at 690.

Figure 7:
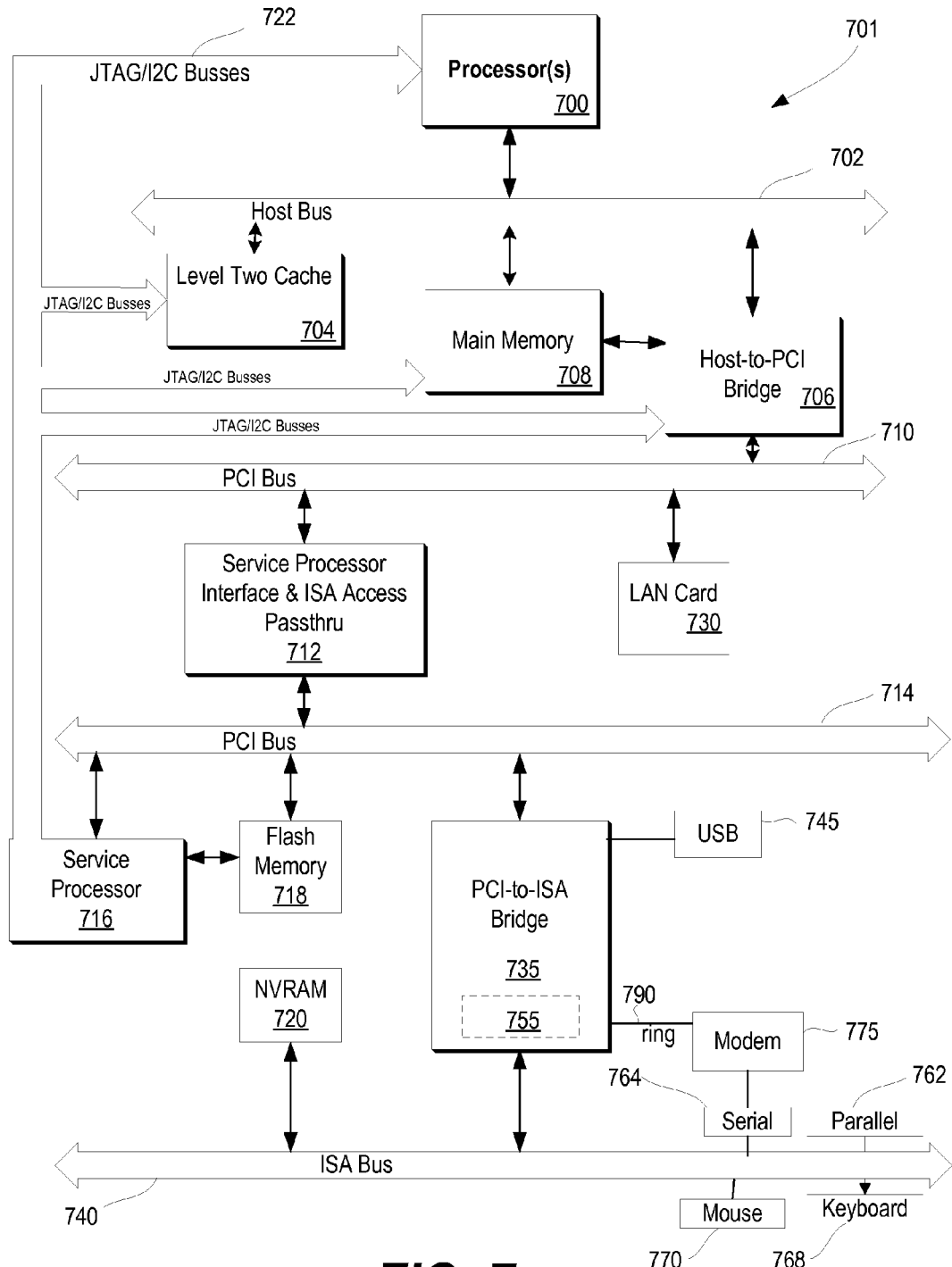
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While FIG. 7 shows one information handling system that employs processor(s) 700, the information handling system may take many forms. For example, information handling system 701 may take the form of a desktop, server, portable, laptop, notebook, or other form factor computer or data processing system. Information handling system 701 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving, at a computer system, a relational user request from a user, wherein the relational user request is based upon a relationship type between the user and recipient users;
   identifying a rule corresponding to the relational user request, wherein the rule identifies a number of path lengths in a hierarchical social networking map between the user and the recipient users;
   retrieving, from the social networking map, a plurality of user identifiers based upon the identified rule;
   displaying the plurality of user identifiers to the user;
   receiving a collaboration message from the user in response to the displaying of the plurality of user identifiers, wherein the collaboration message includes a subsequent rule;
   filtering the plurality of user identifiers based upon the subsequent rule, the filtering creating a second query result that includes a subset of user identifiers; and
   sending the collaboration message to the subset of user identifiers included in the second query result.

2. The method of claim 1 wherein the relationship type is selected from the group consisting of a good friend, a friend, and an acquaintance.

3. The method of claim 1 further comprising:
   sending the relational user request to a social networking map server;
   performing, at the social networking map server, the identification of the rule corresponding to the relation user request and the retrieving of the plurality of user identifiers based upon the identified rules; and
   sending the plurality of user identifiers from the social networking map server to a collaboration tool.

4. The method of claim 1 wherein the social networking map is accessible by a plurality of different collaboration tool types, wherein each of the plurality of different collaboration tool types corresponds to a different type of application program.

5. The method of claim 1 further comprising:
   providing a user interface to the user that includes one or more relational selections;
   receiving a relational selection from the user, wherein the relational selection corresponds to the relational user request; and
   after receiving the plurality of user identifiers, providing the plurality of user identifiers to the user utilizing the user interface.

6. A computer program product stored on a non-transitory computer-readable storage media, the storage media storing instructions for execution by a computer, which, when executed by the computer, cause the computer to implement a method of sending messages, the method comprising:
   receiving, at a computer system, a relational user request from a user, wherein the relational user request is based upon a relationship type between the user and recipient users;
   identifying a rule corresponding to the relational user request, wherein the rule identifies a number of path lengths in a hierarchical social networking map between the user and the recipient users;
   retrieving, from the social networking map, a plurality of user identifiers based upon the identified rule;
   displaying the plurality of user identifiers to the user;
   receiving a collaboration message from the user in response to the displaying of the plurality of user identifiers, wherein the collaboration message includes a subsequent rule;
   filtering the plurality of user identifiers based upon the subsequent rule, the filtering creating a second query result that includes a subset of user identifiers; and
   sending the collaboration message to the subset of user identifiers included in the second query result.

7. The computer program product of claim 6 wherein the relationship type is selected from the group consisting of a good friend, a friend, and an acquaintance.

8. The computer program product of claim 6 wherein the method further comprises:
   sending the relational user request to a social networking map server;
   performing, at the social networking map server, the identification of the rule corresponding to the relation user request and the retrieving of the plurality of user identifiers based upon the identified rules; and
   sending the plurality of user identifiers from the social networking map server to a collaboration tool.

9. The computer program product of claim 6 wherein the social networking map is accessible by a plurality of different collaboration tool types, wherein each of the plurality of different collaboration tool types corresponds to a different type of application program.

10. The computer program product of claim 6 wherein the method further comprises:
    providing a user interface to the user that includes one or more relational selections;
    receiving a relational selection from the user, wherein the relational selection corresponds to the relational user request; and
    after receiving the plurality of user identifiers, providing the plurality of user identifiers to the user utilizing the user interface.

11. An information handling system comprising:
    one or more processors;
    a memory accessible by one or more of the processors;
    one or more nonvolatile storage devices accessible by one or more of the processors; and a set of instructions stored in the memory, wherein one or more processors execute the set of instructions in order to perform actions of:

receiving a relational user request from a user, wherein the relational user request is based upon a relationship type between the user and recipient users;

identifying a rule corresponding to the relational user request, wherein the rule identifies a number of path lengths in a hierarchical social networking map between the user and the recipient users;

retrieving, from one of the nonvolatile storage devices, a plurality of user identifiers based upon the identified rule;

displaying the plurality of user identifiers to the user on a display;

receiving a collaboration message from the user in response to the displaying of the plurality of user identifiers, wherein the collaboration message includes a subsequent rule;

filtering the plurality of user identifiers based upon the subsequent rule, the filtering creating a second query result that includes a subset of user identifiers; and sending the collaboration message to the subset of user identifiers included in the second query result.

12. The information handling system of claim 11 wherein the relationship type is selected from the group consisting of a good friend, a friend, and an acquaintance.

13. The information handling system of claim 11 further comprising an additional set of instructions in order to perform actions of:

sending the relational user request to a social networking map server;

performing, at the social networking map server, the identification of the rule corresponding to the relation user request and the retrieving of the plurality of user identifiers based upon the identified rules; and sending the plurality of user identifiers from the social networking map server to a collaboration tool.

14. The information handling system of claim 11 wherein the social networking map is accessible by a plurality of different collaboration tool types, wherein each of the plurality of different collaboration tool types corresponds to a different type of application program.

\* \* \* \* \*